US00RE37486B1

(19) United States
(12) Reissued Patent
Stanzione

(10) Patent Number: US RE37,486 E
(45) Date of Reissued Patent: Dec. 25, 2001

(54) CONTOURING SANDING SYSTEM

(76) Inventor: Rick B. Stanzione, 3515 Kingston Cir., Ogden, UT (US) 84403

(21) Appl. No.: 09/264,151

(22) Filed: Mar. 5, 1999

Related U.S. Patent Documents

Reissue of:
(64) Patent No.: 5,651,728
Issued: Jul. 29, 1997
Appl. No.: 08/662,235
Filed: Jun. 14, 1996

(51) Int. Cl.[7] ..... B24D 15/00
(52) U.S. Cl. ..... 451/523; 451/495; 451/525; 451/514
(58) Field of Search ..... 451/495, 514, 451/521, 523, 524, 252, 557, 558

(56) References Cited

U.S. PATENT DOCUMENTS

| | | | | |
|---|---|---|---|---|
| 296,370 | * | 4/1884 | Walker | 451/521 |
| 1,067,280 | * | 7/1913 | Smilovetz . | |
| 1,599,906 | * | 9/1926 | McKnight . | |
| 1,844,996 | * | 2/1932 | Walker . | |
| 2,256,098 | * | 9/1941 | Mauldin . | |
| 2,280,767 | * | 4/1942 | Ferragano | 451/557 |
| 2,400,928 | * | 5/1946 | Hein . | |
| 5,054,248 | * | 10/1991 | Thayer . | |
| 5,172,524 | * | 12/1992 | Poss . | |
| 5,383,308 | * | 1/1995 | Beloff et al. | 451/519 |
| 5,512,010 | * | 4/1996 | Lebad, Jr. | 451/344 |

FOREIGN PATENT DOCUMENTS

| | | | | |
|---|---|---|---|---|
| 122642 | * | 10/1927 | (CH) | 451/523 |
| 362054676 | * | 3/1987 | (JP) | 451/524 |

* cited by examiner

*Primary Examiner*—Eileen P. Morgan

(57) ABSTRACT

A new [Countouring] *Contouring* Sanding System for sanding various shapes of surfaces while providing the user an ergonomic sanding block decreasing wear on the user's hands. The inventive device includes an ergonomic sanding block, a template securing means attached to the ergonomic sanding block, and a molding template removably secured within the ergonomic sanding block by the template securing means.

8 Claims, 3 Drawing Sheets

CONTOURING SANDING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to Sanding Devices and more particularly pertains to a new [Countouring] *Contouring* Sanding System for sanding various shapes of surfaces while providing the user an ergonomic sanding block decreasing wear on the user's hands.

2. Description of the Prior Art

The use of Sanding Devices is known in the prior art. More specifically, Sanding Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Sanding Devices include U.S. Pat. No. 5,383,308; U.S. Pat. No. 5,168,672; Design U.S. Pat. No. 340,853; Design U.S. Pat. No. 319,766; U.S. Pat. No. 4,478,011 and U.S. Pat. No. 3,975,868.

While these devices fulfill their respective, particular objectives and requirements, the aforementioned patents do not disclose a new [Countouring] *Contouring* Sanding System. The inventive device includes an ergonomic sanding block, a template securing means attached to the ergonomic sanding block, and a molding template removably secured within the ergonomic sanding block by the template securing means.

In these respects, the [Countouring] *Contouring* Sanding System according to the present invention substantially departs from the conventional concepts and designs of the prior art, and in so doing provides an apparatus primarily developed for the purpose of sanding various shapes of surfaces while providing the user an ergonomic sanding block decreasing wear on the user's hands.

SUMMARY OF THE INVENTION

In view of the foregoing disadvantages inherent in the known types of Sanding Devices now present in the prior art, the present invention provides a new [Countouring] *Contouring* Sanding System construction wherein the same can be utilized for sanding various shapes of surfaces while providing the user an ergonomic sanding block decreasing wear on the user's hands.

The general purpose of the present invention, which will be described subsequently in greater detail, is to provide a new [Countouring] *Contouring* Sanding System apparatus and method which has many of the advantages of the Sanding Devices mentioned heretofore and many novel features that result in a new [Countouring] *Contouring* Sanding System which is not anticipated, rendered obvious, suggested, or even implied by any of the prior art Sanding Devices, either alone or in any combination thereof.

To attain this, the present invention generally comprises an ergonomic sanding block, a template securing means attached to the ergonomic sanding block, and a molding template removably secured within the ergonomic sanding block by the template securing means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new [Countouring] *Contouring* Sanding System apparatus and method which has many of the advantages of the Sanding Devices mentioned heretofore and many novel features that result in a new [Countouring] *Contouring* Sanding System which is not anticipated, rendered obvious, suggested, or even implied by any of the prior art Sanding Devices, either alone or in any combination thereof.

It is another object of the present invention to provide a new [Countouring] *Contouring* Sanding System which may be easily and efficiently manufactured and marketed.

It is a further object of the present invention to provide a new [Countouring] *Contouring* Sanding System which is of a durable and reliable construction.

An even further object of the present invention is to provide a new [Countouring] *Contouring* Sanding System which is susceptible of a low cost of manufacture with regard to both materials and labor, and which accordingly is them susceptible of low prices of sale to the consuming public, thereby making such [Countouring] *Contouring* Sanding System economically available to the buying public.

Still yet another object of the present invention is to provide a new [Countouring] *Contouring* Sanding System which provides in the apparatus and methods of the prior art some of the advantages thereof, while simultaneously overcoming some of the disadvantages normally associated therewith.

Still another object of the present invention is to provide a new [Countouring] *Contouring* Sanding System for sanding various shapes of surfaces while providing the user an ergonomic sanding block decreasing wear on the user's hands.

Yet another object of the present invention is to provide a new [Countouring] *Contouring* Sanding System which includes an ergonomic sanding block, a template securing means attached to the ergonomic sanding block, and a molding template removably secured within the ergonomic sanding block by the template securing means.

Still yet another object of the present invention is to provide a new [Countouring] *Contouring* Sanding System that conforms to the shape of the user's hands thereby reducing the stresses involved with sanding.

Even still another object of the present invention is to provide a new [Countouring] *Contouring* Sanding System that sands the object's surface evenly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
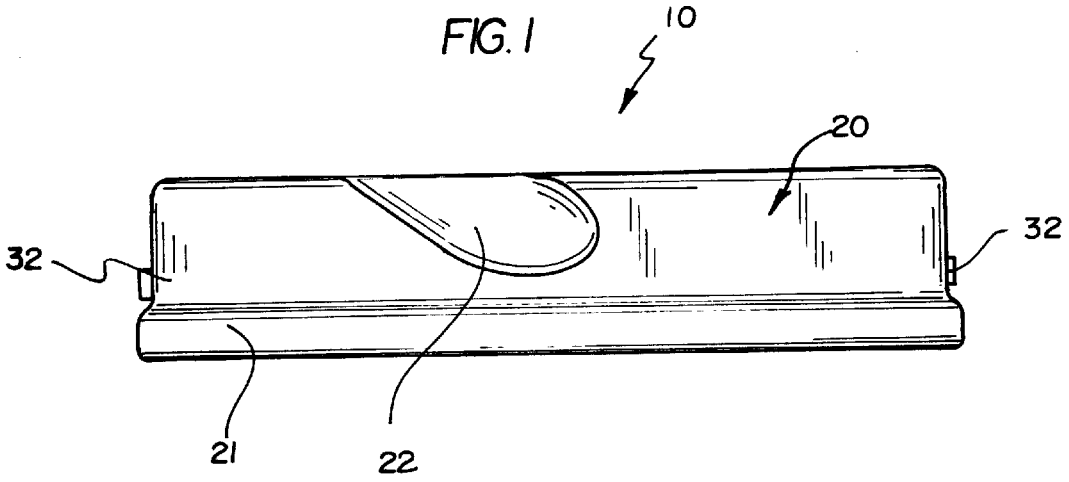
FIG. 1 is a side view of a new [Countouring] *Contouring* Sanding System according to the present invention.

With reference now to the drawings, and in particular to FIGS. 1 through 7 thereof, a new [Countouring] *Contouring* Sanding System embodying the principles and concepts of the present invention and generally designated by the reference numeral 10 will be described.

More specifically, it will be noted that the [Countouring] *Contouring* Sanding System 10 comprises an ergonomic sanding block 20 rectangular shaped, a template securing means 30 positioned within the ergonomic sanding block 20, a molding template 40 removably secured within the ergonomic sanding block 20 by the template securing means 30, and an abrasive paper sheet 12 secured to the bottom side of the molding template 40 by a sanding flange 21 secured around a perimeter of the bottom side.

Figure 2:
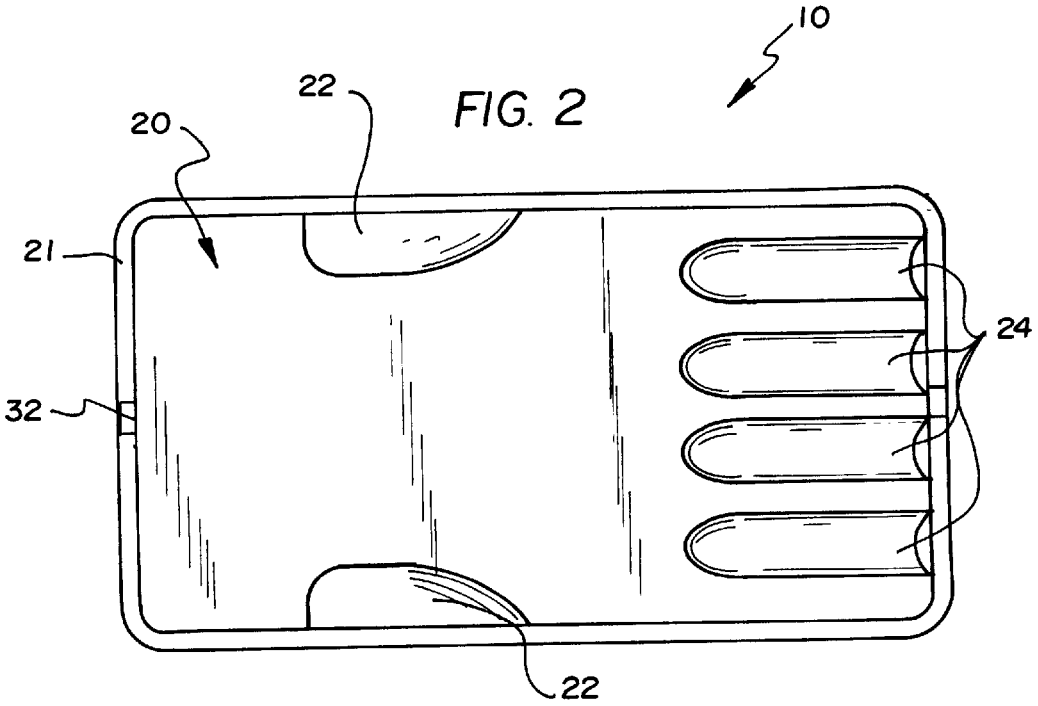
FIG. 2 is a top view thereof showing the thumb fossa and the finger filisters.
Figure 3:
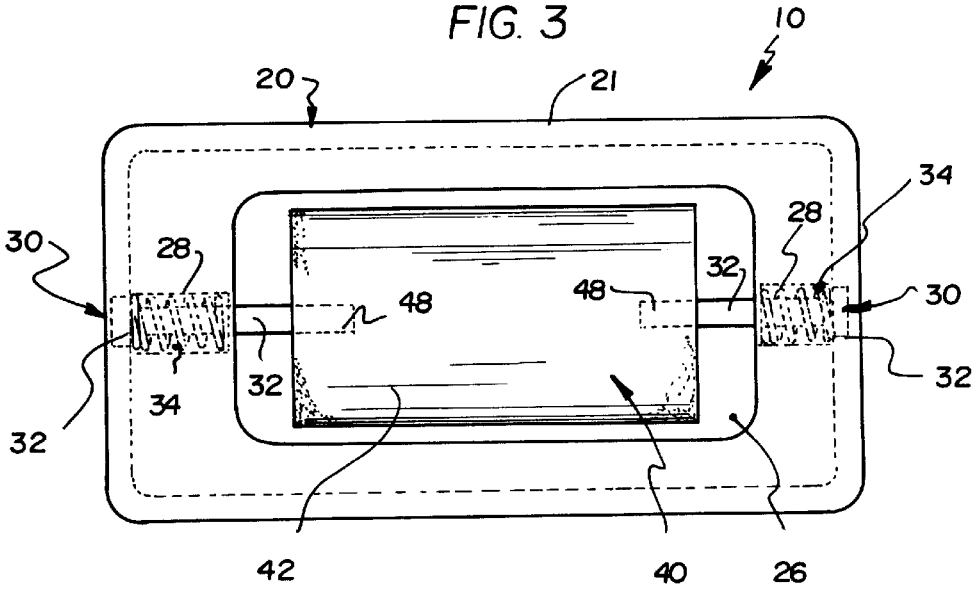
FIG. 3 is a bottom view disclosing the template cavity demountably retaining the first template.
Figure 5:
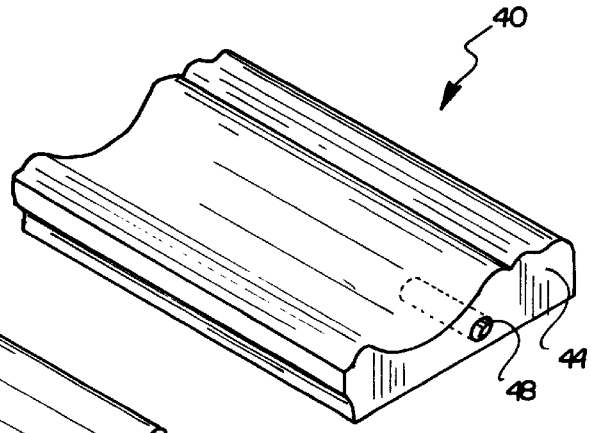
FIG. 5 is a side perspective view of the second template.
Figure 4:
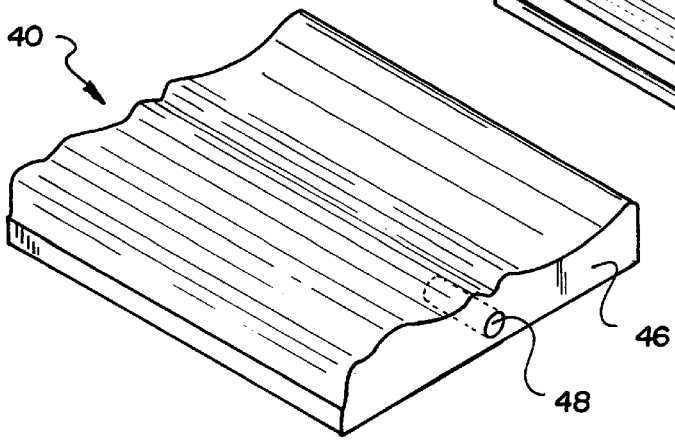
FIG. 4 is a side perspective view of the third template.

As best illustrated in FIGS. 1 through 5, it can be shown that the ergonomic sanding block 20 includes a sanding flange 21 surrounding the lower portion of the ergonomic sanding block 20. At least two thumb fossa 22 are positioned near both of the upper portion of the elongated sides as best shown in FIG. 2 of the drawings. The two thumb fossa 22 are depressions into the elongated sides for allowing both thumbs of the user improved gripping during operation of the present invention. At least four finger filisters 24 are positioned near one end on the top portion of the ergonomic sanding block 20 as best shown in FIG. 2 of the drawings. The four finger filisters 24 are elongated grooves into the top portion of the ergonomic sanding block 20 for allowing the fingers of the user improved gripping. A template cavity 26 is positioned within the bottom side of the ergonomic sanding block shaped to receive the molding template 40 as best shown in FIG. 3 of the drawings. The molding template 40 is formed to various shapes including a first template 42, a second template 44, and a third template 46 as shown in FIGS. 3–5 of the drawings. A pin aperture 28 is centrally positioned into the vertical side of the ergonomic sanding block 20 near the finger filisters 24 terminating into the template cavity 26. Another pin aperture 28 is positioned into the opposite vertical side of the ergonomic sanding block 20 terminating into the template cavity 26 as best shown in FIG. 3 of the drawings. The template securing means 30 includes a compression spring 34 positioned within the pin aperture 28 of the ergonomic sanding block 20. A release pin 32 projects through each compression spring 34 and further through the pin aperture 28 into the template cavity 26, where the release pin 32 terminates removably into the molding template 40. The molding template 40 includes a pin passage 48 centrally positioned at one end and another pin passage 48 centrally positioned at the opposite end. The release pins 32 project into respective pin passages 48 demountably securing the molding template 40 within the template cavity 26 of the ergonomic sanding block 20 as shown in FIG. 3 of the drawings wherein the release pins 32 snugly engage the molding template 40 for preventing longitudinal movement of the molding template 40. The molding template 40 is further formed to various shapes so as to evenly sand various shapes of objects. The molding template 40 is prevented from rotating because the molding template 40 is juxtaposed to an upper surface of the template cavity 26.

Figure 6:
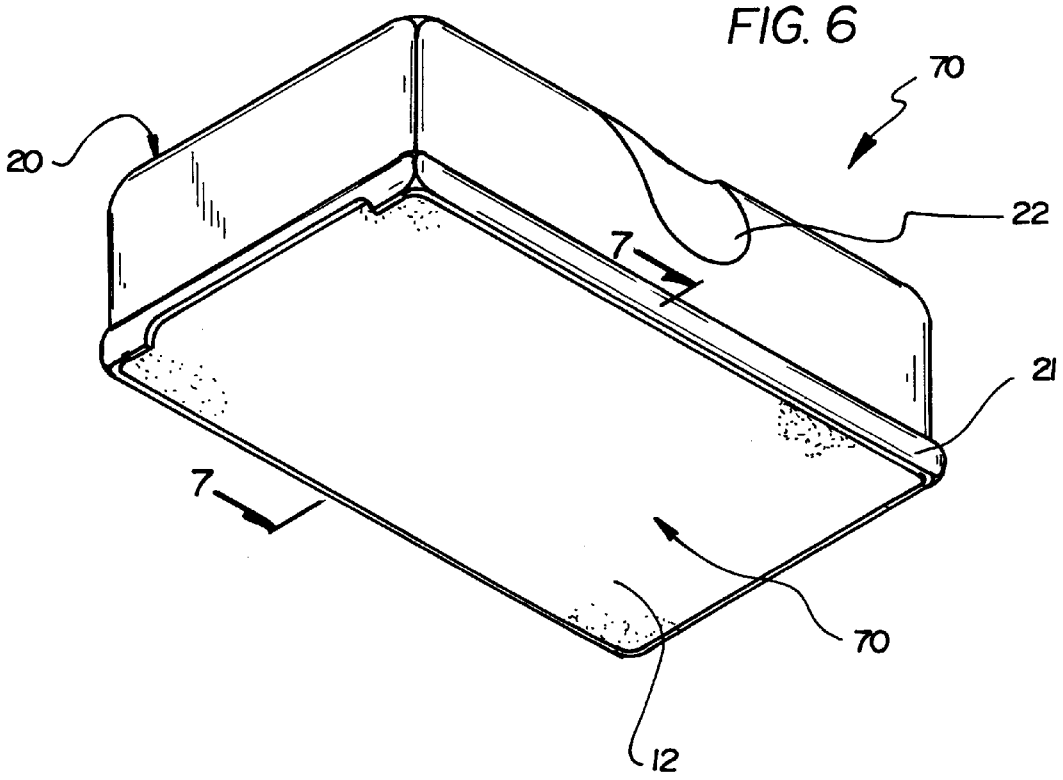
FIG. 6 is a lower perspective view an alternative embodiment comprising a gel filled sanding block.
Figure 7:
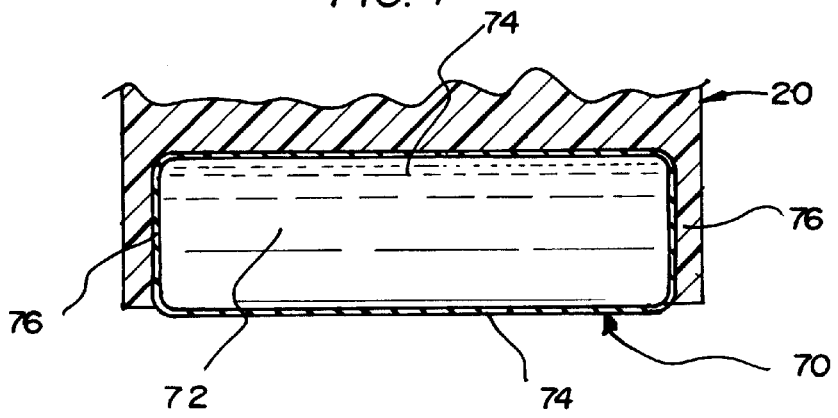
FIG. 7 is a cross sectional view taken along line 7—7 of FIG. 6 disclosing the gel solution and the resilient gel container secured within the ergonomic sanding block.

In an alternative embodiment as shown in FIGS. 6–7 of the drawings, a gel filled sanding block 70 includes an ergonomic sanding block 20 that is rectangular shaped. A sanding flange 21 surrounds the lower portion of the ergonomic sanding block 20. At least two thumb fossa 22 are positioned near both of the upper portion of the elongated sides of the ergonomic sanding block 20. At least four finger filisters 24 are positioned near one end on the top portion of the ergonomic sanding block 20. A gel container aperture 76 is positioned within the bottom side of the ergonomic sanding block 20 formed to receive a resilient gel container 74. An abrasive paper sheet 12 is secured to the bottom side of the gel container so as to sand various shapes of surfaces. The resilient gel container 74 contains a gel solution 72 so as to conform to various shapes.

In use, the user releases the release pins 32 allowing insertion of the molding template 40. The user inserts the molding template 40 into the template cavity 26 and thereafter engages the release pins 32 to the molding template 40. The user then secures an abrasive paper sheet 12 to the bottom side of the molding template 40. The user then manually sands various shapes of objects providing an even sanding area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Contouring Sanding System comprising:

an ergonomic sanding block substantially rectangular shaped having a lower portion, an upper portion, a top surface, a bottom surface, a pair of elongated sides, a vertical side and an opposite vertical side;

a template securing means positioned within the ergonomic sanding block;

a molding template removably secured within the ergonomic sanding block by the template securing means;

an abrasive paper sheet secured to a bottom side of the molding template; and the ergonomic sanding block includes:

a sanding flange surrounding the lower portion of the ergonomic sanding block;

at least two thumb fossa positioned into the upper portion of the elongated sides;

at least four finger filisters positioned into the top surface;

a template cavity projecting into the bottom surface of the sanding block shaped to receive the molding template; and a pin aperture centrally positioned into the vertical side near the finger filisters terminating into the template cavity and another pin aperture into the opposite vertical side terminating into the template cavity.

2. The Contouring Sanding System of claim 1, wherein the template securing means includes:

a compression spring slidably positioned within each of the pin apertures within the ergonomic sanding block; and a release pin projecting through the compression spring and further through the pin aperture into the template cavity, where the release pin terminates removably into the molding template.

3. The Contouring Sanding System of claim 2, wherein the molding template includes a pin passage centrally positioned at one end and another pin passage centrally positioned at an opposite end, where the release pins project into respective pin passages demountably securing the molding template within the template cavity of the ergonomic sanding block.

4. The [Countouring] *Contouring* Sanding System of claim 3, wherein the molding template is further formed to various shapes so as to evenly sand various shapes of objects.

*5. A contoured sanding system comprising:*

*an ergonomic sanding block having a lower portion, an upper portion, a top surface, a bottom surface, and a pair of elongated sides, a vertical side and an opposite vertical side;*

*a sanding flange surrounding the lower portion of the ergonomic sanding block;*

*a thumb fossa formed in the upper portion of each of the elongated sides of the ergonomic sanding block, each of the fossa extending into the top surface of the sanding block;*

*at least two finger filisters formed in the top surface of the ergonomic sanding block;*

*a gel container aperture defined by the sanding flange and the bottom surface of the ergonomic sanding block;*

*a resilient gel container positioned in the gel container aperture of the ergonomic sanding block, the gel container having a bottom side;*

*a gel solution contained in the gel container for permitting the gel container to conform to various shapes; and*

*an abrasive paper sheet secured to the bottom side of the gel container.*

*6. A contoured sanding system comprising:*

*a sanding block having a lower portion, an upper portion, a top surface, a bottom surface, and a pair of elongated sides, a first end and a second end;*

*a template securing means positioned on the sanding block;*

*a molding template removably secured to the sanding block by the template securing means; and*

*an abrasive secured to a bottom side of the molding template;*

*wherein the sanding block includes:*

*a fossa formed in the upper portion of each of the elongated sides of the sanding block, each of the fossa extending into the top surface of the sanding block; and*

*at least two finger filisters formed in the top surface of the sanding block;*

*wherein the template securing means includes a sanding flange surrounding the lower portion of the sanding block.*

*7. A contoured sanding system comprising:*

*a sanding block having a lower portion, an upper portion, a top surface, a bottom surface, and a pair of elongated sides, a first end and a second end;*

*a template securing means positioned on the sanding block;*

*a molding template removably secured to the sanding block by the template securing means; and*

*an abrasive secured to a bottom side of the molding template;*

*wherein the sanding block includes:*

*a fossa formed in the upper portion of each of the elongated sides of the sanding block, each of the fossa extending into the top surface of the sanding block; and*

*at least two finger filisters formed in the top surface of the sanding block;*

*wherein the template securing means includes a template cavity projecting into the bottom surface of the sanding block shaped to receive the molding template.*

*8. A contoured sanding system comprising:*

*a sanding block having a lower portion, an upper portion, a top surface, a bottom surface, and a pair of elongated sides, a first end and a second end;*

*a template securing means positioned on the sanding block;*

*a molding template removably secured to the sanding block by the template securing means; and*

*an abrasive secured to a bottom side of the molding template;*

*wherein the sanding block includes:*

*a fossa formed in the upper portion of each of the elongated sides of the sanding block, each of the fossa extending into the top surface of the sanding block; and*

*at least two finger filisters formed in the top surface of the sanding block;*

*wherein each of the elongated sides has a substantially planar surface and each fossa is surrounded toward the bottom surface and the first and second ends by the substantially planar surface of the elongated side.*

* * * * *